May 21, 1929.   O. G. LISSEN   1,714,431
SAFETY DASHPOT
Filed Sept. 24, 1926   2 Sheets-Sheet 1

WITNESSES
INVENTOR
OLOV GUSTAV LISSEN
BY
ATTORNEYS

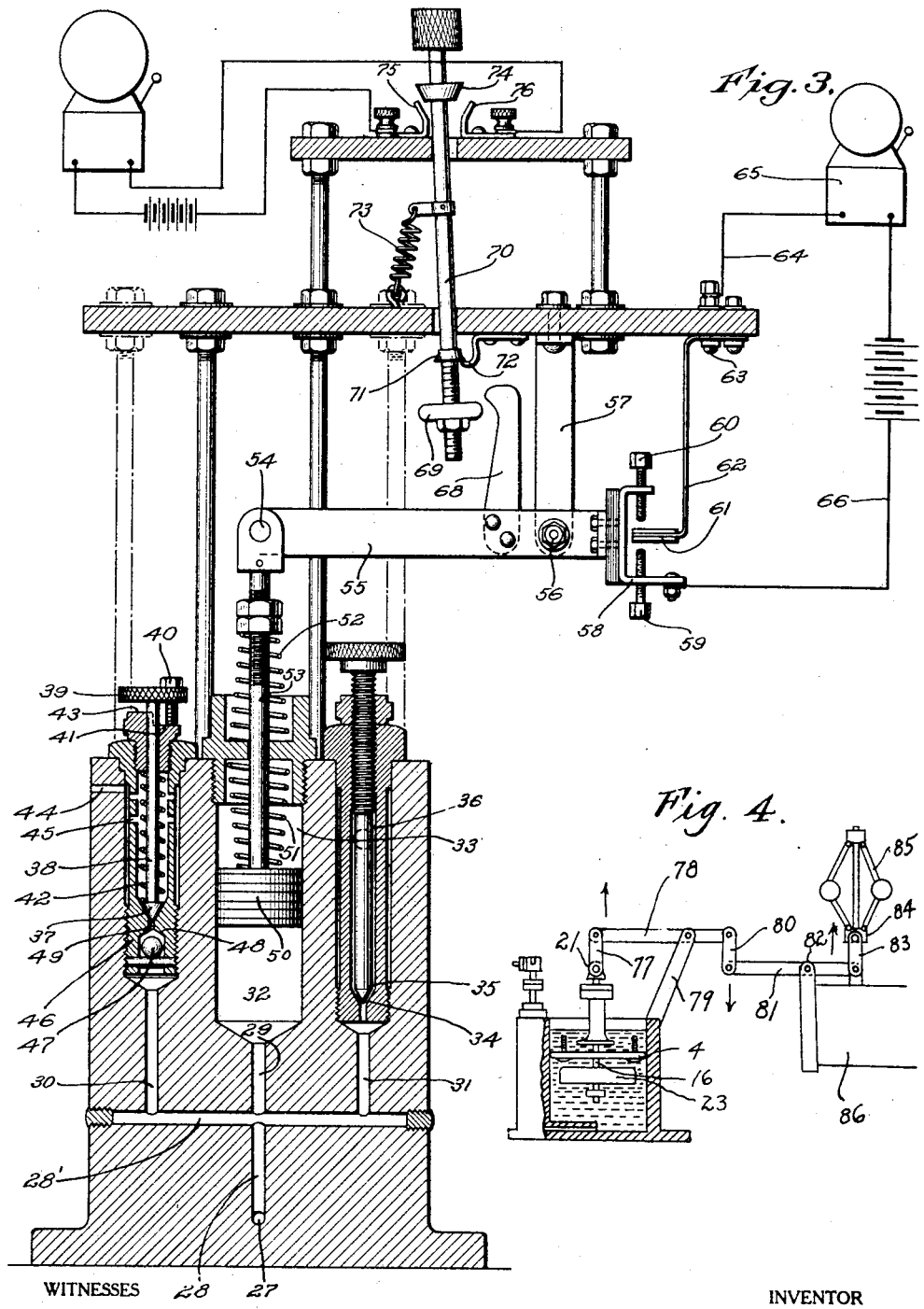

Patented May 21, 1929.

1,714,431

UNITED STATES PATENT OFFICE.

OLOV GUSTAV LISSEN, OF JERSEY CITY, NEW JERSEY.

SAFETY DASHPOT.

Application filed September 24, 1926. Serial No. 137,610.

This invention relates to governors and particularly to fluid governors of the dashpot variety, the same to be used in conjunction with centrifugal governors now in common use found on steam engines, turbines, electric generators and other prime movers, the object being to present a construction which will provide the proper damping effect while permitting quick movement under unusual circumstances.

Another object of the invention is to provide a safety dashpot wherein an unusual movement may be permitted after a proper resistance, the structure being such that an alarm will be sounded when said movement takes place.

A still further object of the invention is to provide a safety dashpot wherein an alarm will be sounded when an unusual movement takes place and a second alarm will be sounded when the unusual movement is extra great, as for instance, when a power belt breaks.

In the accompanying drawings—

Figure 3 is a sectional view through Figure 2 on line 3—3, the same having associated therewith certain contacts embodying certain features of the invention.

Figure 4 is a detail fragmentary sectional view through part of the device shown in Figure 1, and illustrating the connection thereof with the ordinary fly-ball governor of an engine.

Figure 1:
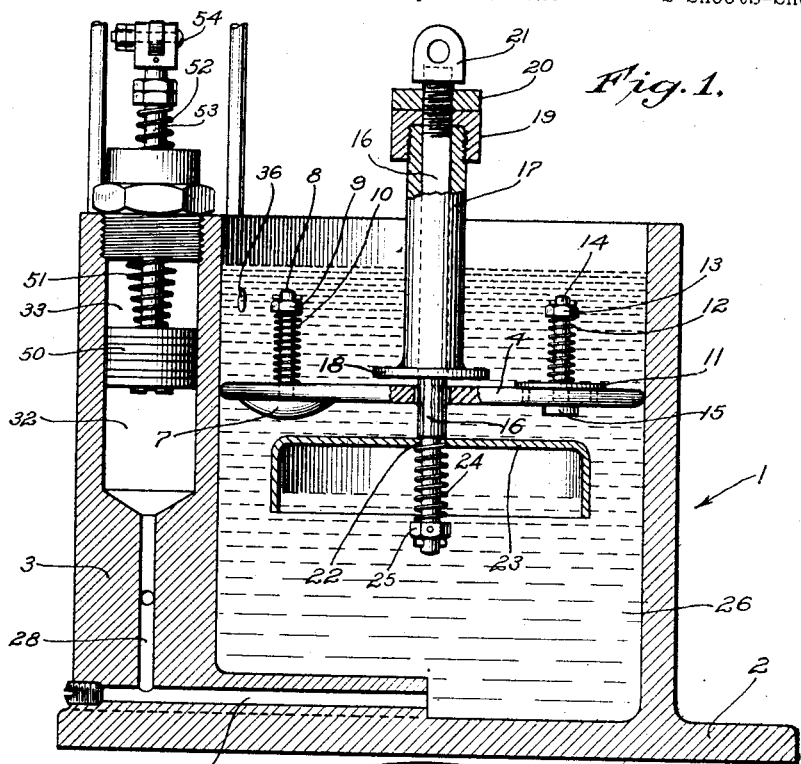
Figure 1 is a vertical sectional view through a dashpot disclosing certain features of the invention.
Figure 2:
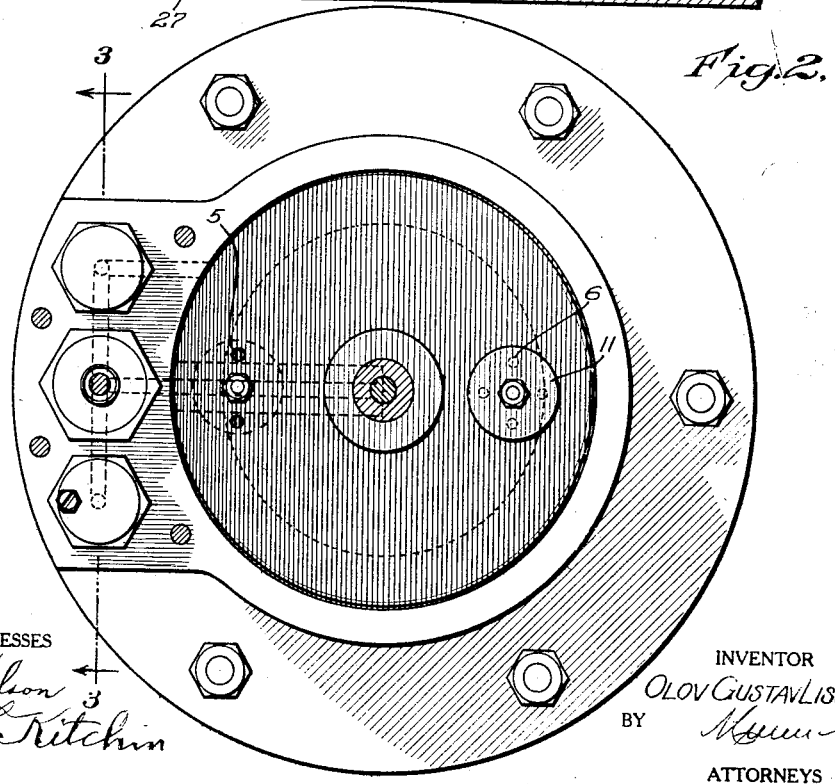
Figure 2 is a top plan view of the structure shown in Figure 1.

Referring to the accompanying drawings by numerals, 1 indicates a cylinder which acts as a pot, the same having a base 2 which is preferably integral therewith and which is also preferably integral with an enlargement or thickened portion 3 adapted to have certain valves and other parts hereinafter fully described. Arranged in the pot 1 is a piston 4 which may be any desired material, as for instance, metal, and which is provided with sets of openings 5 and 6. Openings 5 are normally closed by what may be termed a valve 7, said valve carrying shaft 8 extending through the piston 4. Shaft 8 is provided with a nut or other abutment 9 adapted to be engaged by the spring 10 which also presses against the piston 4 whereby valve 7 is normally maintained closed. Valve 11 is provided for normally closing opening 6, said valve being held against the piston 4 for closing these openings by a suitable spring 12 acting against the nut or abutment 13 and against the valve. A shaft 14 extends through valve 11 and is provided with an enlarged head 15 whereby the valve is properly guided in its back and forth movement as it opens and closes. It will be noted that valve 7 opens in one direction and valve 11 in the opposite direction. Slidingly extending through the piston 4 is a rod 16 which is surrounded by a hollow shaft 17, said hollow shaft having an enlargement 18 at the lower end. A cap 19 is screwed onto the hollow shaft 17 and said cap is locked in position by nut 20 screwed onto the upper end of rod 16, said rod at the upper end also having a fitting 21 which is shown as an eye member and which is adapted to be connected to the ordinary fly-ball governor of the engine or other prime mover so as to act as a damper therefor. Rod 16 near the lower end is provided with a reduced section whereby a shoulder 22 is presented against which the inverted cup 23 normally presses, the same being held in this position normally by the spring 24 which acts on the cup 23 and on the abutment 25, which abutment may be a nut screwed in position or any other suitable abutment.

When the eye or fitting 21 is given a sudden pull, the rod 16 will loosely slide through piston 4 without moving the piston but spring 24 will be compressed and if the pull continues, cup 23 will be moved upwardly into contact with the piston 4 and then piston 4 will be moved upwardly, valve 7 opening. If the cup 23 is against piston 4 and there is a quick upward pull, spring 24 will be compressed and gradually this pressure will be relieved by the upward movement of piston 4 and cup 23. Normally, piston 4 is resting on top of cup 23 so that a quick upward movement is taken up by spring 24 unless said movement is too great and when this is the case all the parts will move up and valve 7 will open. If there is a quick downward movement, hollow shaft 17 and rod 16 will move downwardly quickly and as the shoulder 22 is engaging cup 23, said cup will move downwardly quickly and compress air confined therein which will give more and more resistance. By the time the resistance of the air is equal to the resistance of the oil or other liquid 26, the enlargement or shoulder 18 is in engagement with the piston 4 and will force said piston down, valve 11 opening. When the piston 4 is moving downwardly, some of the oil 26 will be forced through the passage-way 27 into the passage-way 28 and from said passage-way into the three passage-ways 29, 30 and 31. Passage-ways 27, 28 and 28', as well as passage-ways 29 and 31, are usually filled with oil as well as the space 32 forming part of the chamber 33. Oil in the passage-way 31 extends upwardly past the valve seat 34 and the valve 35 to the overflow outlet 36 which is preferably a short distance below the level of the oil 26 as shown in Figure 1. It will thus be seen that any appreciable upward or downward movement of the piston 4 will cause the oil to be brought under tension or pressure or partly drawn away from passage-ways 29 and 30 and associated passage-ways. The passage-way 31 and associated parts, acts merely as a by-pass and by regulating the valve 35 the rapidity of flow of the oil from one side of piston 4 to the other side through passage-way 31 may be regulated. If considerable resistance is desired to the movement of the piston 4, valve 35 is almost closed whereas if only a slight resistance is desired, valve 35 is opened wide. It will thus be seen that rod 16 has a movement independent of piston 4 within certain limits and during this movement the engine may speed up quickly or may slow down quickly. As shown in Figure 4, eye 21 is pivotally connected with a link 77 which in turn is pivotally connected to a lever 78 pivotally mounted on a suitable support 79. Link 80 connects lever 78 with a lever 81 which in turn is pivoted on a suitable support 82 so that one end may be pivotally connected to link 82 which link at the opposite end is pivotally connected to the ring 84 forming part of the fly-ball governor 85 of engine 86.

When first setting up the device and occasionally thereafter, it may be desired to regulate the amount of air confined by the cup 23. When it is desired to admit some air to the under surface of this cup, valve 37 is opened. Valve 37 is provided with a stem 38 having a thumb member or head 39 carrying a screw 40. When the valve 37 is closed, the lower end of screw 40 is resting on the shoulder 41. When it is desired to fully open valve 37, head 39, together with screw 40, is raised bodily upwardly against the action of the spring 42 and turned until the lower end of screw 40 rests on the shoulder 43. Whenever there is any upward movement of the piston 4, a suction will be produced in passage-way 30 and air will be drawn in through the opening 44, said air passing through suitable openings 45 in the casing 46 of valve 42. This air will eventually find its way past valve 37 and past the ball valve 47. Valve 47 has its seat 48 which it engages whenever there is a downward movement of the piston 4. It will thus be seen that when valve 37 is open, the inlet passage-way 49 will be closed by valve 37 but when the piston 4 moves upwardly, air will be drawn through passage-way 49. This air will gradually find its way through passage-way 30, passage-way 28', passage-way 28 and passage-way 27 to the pot or cylinder 1. As it moves out of the passage-way 27 it will move upwardly in bubbles and be released within the cup 23. When sufficient air is confined in cup 23, head 39 and associated parts are moved back to the position shown in Figure 3. If desired, valve 37 could be held open slightly or considerably by making the screw 40 longer and then turning the same until the valve 37 has been unseated to the desired extent. Ordinarily, this is not necessary or desirable as the inlet of air takes place only occasionally and is preferably manually controlled as above described. As piston 4 moves upwardly and downwardly, the pressure in the chamber or space 32 will increase or decrease and, consequently, will push the piston 50 upwardly or pull the same downwardly against the action of the respective springs 51 and 52. Piston 50 is connected with a rod 53, which rod is pivotally connected at 54 to a lever 55, said lever in turn being pivotally mounted at 56 on a stationary or fixed bracket 57. Lever 55 extends a short distance beyond the pivotal support 56 and carries a bracket 58 which is insulated therefrom, said bracket carrying a pair of screws 59 and 60, said screws acting as contacts. Associated with these screws is a contact bar 61 of metal connected to the spring support 62 which is connected through a suitable screw 63 to the wire 64. Wire 64 is connected to an alarm device 65 which may be a bell or other suitable device. The screw 56 is connected with a wire 66 which is connected to a source of current 67 and said source of current is connected to one side of bell 65. It will thus be seen that when lever 55 is moved downwardly or upwardly more than a certain distance by the action of liquid 26 in space 32, the circuit of bell 65 will be closed temporarily and opened immediately upon a reverse movement of piston 4. The bell 65 acts as an alarm for indicating when there is a temporary overload or underload. Sometimes a permanent variation in load occurs, as for instance, when the power belt of the engine breaks. When this occurs, the piston 50 is moved downwardly quickly a sufficient distance for the arm 68 to strike the abutment 69 carried by the rod 70 and swing said rod so that the supporting abutment 71 which normally engages the bracket 72 will be pushed off of this bracket. This will permit the spring 73 to quickly move the rod 70 downwardly and cause the contact disk 74 to engage both of the contacts 75 and 76. These two contacts are connected to a source of current similar to the source of current 67 and to an alarm device similar to the alarm device 65. This will permanently close the circuit of this last mentioned alarm device and said circuit cannot be opened until rod 70 is moved upwardly or restored to the position shown in Figure 3. This alarm continually sounds notwithstanding the fact that the piston 4 may be moving upwardly and downwardly rapidly. In view of these two alarms, unusual action of the engine will be noted by the physical movement of the lever 55 and by the action which it produces either in the alarm device 65 or the alarm device controlled by rod 70.

What I claim is:

1. A safety dashpot comprising a cylinder adapted to contain oil, a rod extending into said cylinder, a piston arranged in said cylinder operatively connected with the rod, a signalling device, and means operated by the movement of the oil as the piston moves for setting into operation said signalling device when the piston is moved in either direction at a rate of movement greater than a predetermined speed.

2. In a safety dashpot a piston adapted to be moved in either of two directions as the dashpot functions, an alarm device, and means operated by said piston for setting in motion said alarm device when the piston has been moved at a rate of movement greater than a predetermined speed.

3. The combination with a dashpot provided with a piston, of means presenting an alarm mechanism for indicating when the piston moves at an abnormal speed, said alarm mechanism including a sounding device, means for causing said sounding device to function, an auxiliary piston for causing said means to function, and means forming a chamber for said auxiliary piston, and a passageway extending into the lower part of said dashpot whereby as the oil is moved at a movement greater than a predetermined speed in either direction by the piston in the dashpot the auxiliary piston will be moved so as to actuate the first mentioned means.

4. In a safety dashpot a cylinder adapted to contain oil, a piston mounted in said cylinder, said cylinder being provided with an enlargement at one point, said enlargement being provided with three large bores and with a plurality of smaller bores connecting said large bores acting as communicating passageways between said large bores and the bottom of said cylinder, means in one of said large bores for controlling the admission of air into said passage-ways, means in a second large bore for regulating the flow of oil from one side of said piston to the other, an auxiliary piston arranged in the third large bore and adapted to be moved as the oil is forced downwardly or drawn upwardly in said cylinder at a rate of movement greater than a predetermined speed, a lever actuated by said auxiliary piston, and an alarm device caused to function by said lever.

5. A safety dashpot comprising a cylinder adapted to contain, a piston mounted in said cylinder, said cylinder at one point being formed with a comparatively thick wall and provided with a large bore merging into a small bore communicating with the bottom of the cylinder, an auxiliary piston arranged in said large bore, means including a pair of springs for normally holding said auxiliary piston in a given position, said auxiliary piston being movable in either of two directions by oil from the cylinder when the piston in the cylinder moves at an unusual speed, an alarm device and means operated by said auxiliary piston for causing said alarm device to function.

6. In a dashpot operated signal system, a pair of electrically operated signalling devices, means presenting a circuit for each signaling device, a pivotally mounted lever, a pair of spaced contacts carried by said lever forming part of said circuit, said lever forming part of the circuit of one of said signalling devices, said space contacts being positioned to normally maintain said circuit open while acting to close the circuit when said lever has moved a predetermined distance, means acting as a switch for closing the circuit of the second signalling device, and means actuated by said lever for moving said switch permanently to a closed position when the lever has moved an extraordinary distance in one direction.

OLOV GUSTAV LISSEN.